United States Patent
Sugiyama et al.

[11] Patent Number: 6,089,731
[45] Date of Patent: Jul. 18, 2000

[54] FUSION-WELDING LEG IN VEHICLE LAMP

[75] Inventors: Fujihiko Sugiyama; Shigeyuki Soga, both of Shizuoka, Japan

[73] Assignee: Koito Manufacturing Co., Ltd., Tokyo, Japan

[21] Appl. No.: 09/084,449

[22] Filed: May 27, 1998

[30] Foreign Application Priority Data

May 30, 1997 [JP] Japan ................................. 9-156119

[51] Int. Cl.$^7$ .............................. F21V 7/00; F21V 13/02; F21V 29/00
[52] U.S. Cl. .................... 362/310; 362/507; 362/548; 362/267; 362/374; 428/35
[58] Field of Search ...................... 362/310, 374, 362/375, 61, 267, 268, 519, 548, 507; 428/35

[56] References Cited

U.S. PATENT DOCUMENTS

| | | | |
|---|---|---|---|
| 4,601,927 | 7/1986 | Durfee | 428/35 |
| 4,972,303 | 11/1990 | Machida et al. | 362/80 |
| 5,562,338 | 10/1996 | Yamamoto | 362/61 |
| 5,842,781 | 12/1998 | Yamada et al. | 362/519 |

FOREIGN PATENT DOCUMENTS 7-262808  10/1995  Japan .

*Primary Examiner*—Audrey Chang
*Attorney, Agent, or Firm*—Sughrue, Mion, Zinn, Macpeak & Seas, PLLC

[57] ABSTRACT

A fusion-welding leg in a vehicle lamp such that the fusion-welding leg of a front lens as one of the plastic members constituting the vehicle lamp is vibration-fusion-welded to the joint portion of a lamp body as the other plastic member. The inside of the front end of the fusion-welding leg is made substantially perpendicular to the joint surface on the lamp body side, and the outside thereof is tapered off to the leading end thereof so as to form a tapered surface.

21 Claims, 4 Drawing Sheets

FUSION-WELDING LEG IN VEHICLE LAMP

BACKGROUND OF THE INVENTION

1. Field of the Invention

The present invention relates to a vehicle lamp having a predetermined joint where a lamp body for forming the vehicle lamp such as an automobile signal lamp and a front lens for covering the front opening of the lamp body are directly joined together by a fusion-welding method. More particularly, the invention relates to a fusion-welding leg structure of a vehicle lamp in which a predetermined joint where the leg of a front lens and a lamp body are joined together is partially fused with the frictional heat generated by utilizing electromagnetic vibrations before being cooled in order to join both of them together.

2. Related Art

There has heretofore been proposed a vehicle lamp manufactured by the so-called vibration-fusion-welding method for joining together a lamp body 51 made of thermoplastic synthetic resin and a front lens 52 also made of thermoplastic synthetic resin, for example, by vibration-fusion-welding the predetermined joint between them for welding purposes as disclosed in FIGS. 7A and 7B. Such a vehicle lamp is manufactured according to this method comprising the steps of bringing the fusion-welding leg 54 of the front lens 52 into contact with the joint surface 53 of the flange portion of the lamp body of the vehicle lamp, causing frictional heat to be generated by vibrating both of them in the as-joined condition and fitting the fusion-welding leg 54 of the front lens 52 into the joint surface 53 of the lamp body 51. The fusion-welding leg 54 formed on the side of the front lens 52 is so formed as to have the same width vertically as shown in FIG. 7A (indicated by a double-headed arrow A) or otherwise to taper off in cross section to the leading end of the fusion-welding leg 54 as shown in FIG. 7B (indicated by an arrow B).

In the case of the fusion-welding leg 54 on the side of the front lens 54 formed as mentioned previously, the former shown in FIG. 7A, for example, has a wide contact surface with respect to the joint surface 53 on the side of the lamp body 51 and since satisfactory great pressure is not applied to both contact surfaces as a whole, the frictional heat is hardly easily generated and fusion-welding time is made longer thereby; the problem is that the production of burrs on the edge of the fusion-welding leg 54 tends to increase because the fusion welding is carried out at relatively low temperatures. On the other hand, the latter shown in FIG. 7B has the fusion-welding leg 54 having a tip narrow in width and though the fusion-welding time can be shortened because high frictional heat is attained, the production of burrs on the inside and outside edges of the lamp also increases; the problem in this case is that the production of burrs inward tends to deteriorate the illumination effect and the neatness of the external appearance of the lamp.

SUMMARY OF THE INVENTION

In view of the drawbacks accompanying the conventional vibration-fusion-welding legs, it is an object of the present invention to provide a vibration-fusion-welding leg which is capable of generating sufficient frictional heat between the contact surfaces of a lamp body and the front lens when these members are clamped together. Another object of the invention is to provide a vibration-fusion-welding leg capable of reducing the production of burrs on the inside edge of the fusion-welded leg, that is, the production of burrs inside a lamp chamber, and improving the neatness and design quality inside the lamp chamber.

In order to accomplish the object above, a fusion-welding leg in a vehicle lamp according to the present invention wherein the fusion-welding leg of a front lens as one of the plastic members constituting the vehicle lamp is vibration-fusion-welded to the joint portion of a lamp body as the other plastic member is characterized in that the inside of the front end of the fusion-welding leg is made substantially perpendicular to a joint surface on the lamp body side, whereas the outside thereof is tapered off to the leading end thereof so as to form a tapered surface.

The width of the fusion-welding leg in the inside and outside direction substantially ranges from 0.5 to 1.2 mm.

With the arrangement like this, since the pressure applied to the front end of the fusion-welding leg can be increased to raise the frictional heat by decreasing the contact surface of the fusion-welding leg on the front lens side with respect to the joint surface on the lamp body side, the joint surface on the lamp body side melts at high temperatures, thus acting as what rakes burrs outside the fusion-welding leg on the front lens side, that is, outside the lamp chamber. Further, the joint surface on the lamp body side also acts as what makes the inward overhang of the burr a small-diameter column along the fusion-welding leg, thus preventing the burr from badly affecting the luminous surface and design quality of the front lens.

A stepped portion located in the upper portion of the tapered surface may be formed outside the fusion-welding leg. With the formation of such a stepped portion, the total number of burrs produced from the lamp body side can be decreased and the burrs raked outward can also be held down to the stepped portion, whereby the neatness of the external appearance of the joint surface can be improved.

Since the whole contact edge face of the fusion-welding leg is fusion-welded to the joint surface of the lamp body at the vibration-fusion-welding time, the joining force of both can be increased.

It is also acceptable to increase the frictional coefficient by subjecting the fusion-welding leg on the front lens side to embossing, so that pressurizing force per unit area increases by decreasing the contact area with respect to the joint surface on the lamp body side and that heat generating efficiency is also improved thereby.

DESCRIPTION OF THE PREFERRED EMBODIMENT

Figure 1:
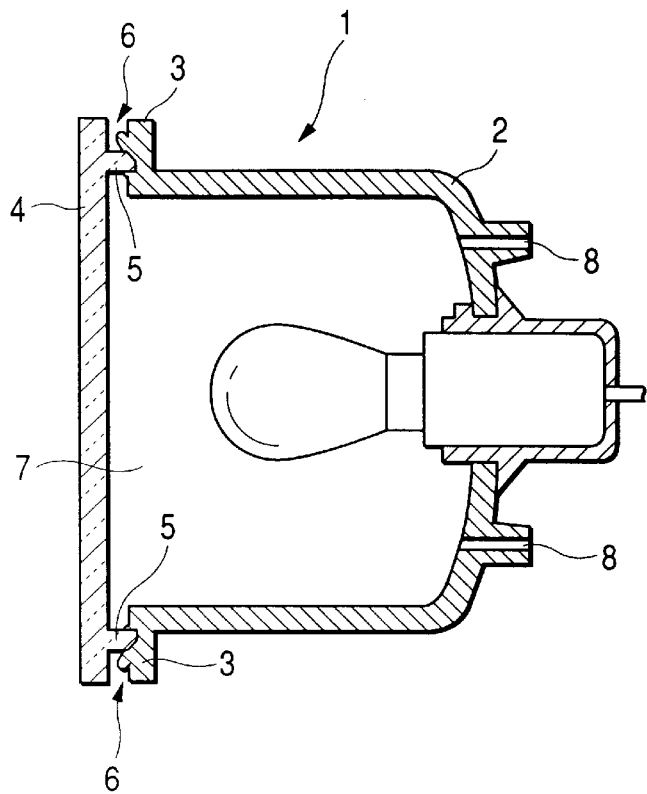
FIG. 1 is a vertical sectional view of a vehicle lamp constructed by vibration-fusion-welding according to the present invention.

Referring to the drawings, there is shown a preferred embodiment of a vibration-fusion-welding leg in a vehicle lamp of the present invention.

FIG. 1 shows a fusion-welding leg in a vehicle lamp according to a first embodiment of the present invention.

A vehicle lamp 1 according to the present invention is fabricated by directly joining the front end of a fusion-welding leg 5 (e.g., sealing leg) formed on the rear peripheral edge portion of a thermoplastic member, that is, a front lens 4 to a joint surface 3 (e.g., a flange) overhanging sideways in the peripheral edge portion of the opening of a lamp body 2. As a fusion-welding portion 6 where the lamp body 2 and the front lens 4 are joined together is made thinner, a greater effective area can be secured in a limited vehicle body space. Further, vent holes 8, 8 for letting the inside of a lamp chamber 7 communicate with the outside thereof in order to prevent a fog from sticking to the inside of the lamp chamber 7 are opened in the rear portion of the lamp body 2.

Figure 2A:
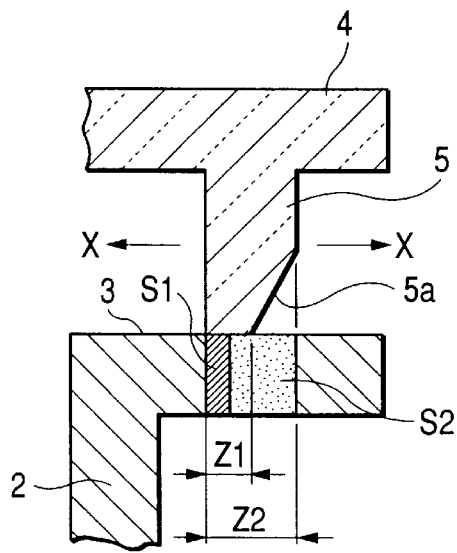
FIG. 2A is an enlarged sectional view of the principal part of the fusion-welding leg according to the first embodiment of the invention.

FIGS. 2A to 2D show the structure of the vibration-fusion-welding leg 5 of the front lens 4 of the vehicle lamp 1 according to the present invention. As shown therein, the fusion-welding leg 5 has a tapered surface 5a such that the outside of the fusion-welding leg is inclined toward its front end side and that the lower edge face thereof is arranged so that it is brought into uniform contact with the joint surface 3 of the flange of the lamp body 2 by the width Z1 of the lower edge face as shown in FIG. 2A.

Figure 2B:
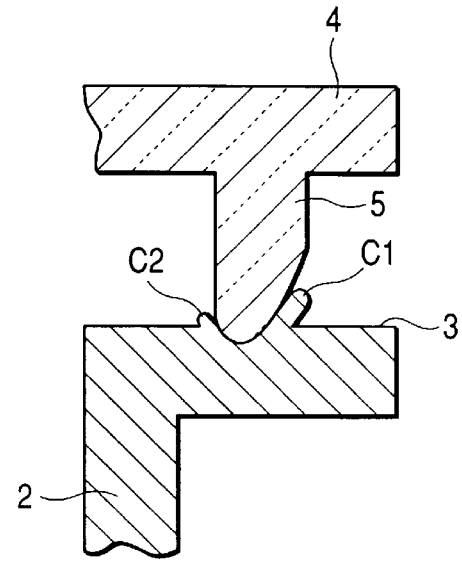
FIG. 2B is an enlarged sectional view of the principal part thereof halfway through the fusion-welding operation.
Figure 2C:
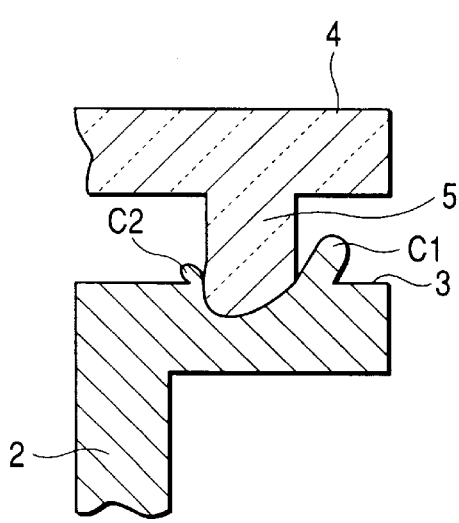
FIG. 2C is an enlarged sectional view of the principal part thereof after the fusion-welding operation.

The fusion-welding leg 5 with the tapered surface 5a inclined outward has a small contact surface with respect to the joint surface 3 on the side of the lamp body 2 when the vibration-fusion-welding work (vibrations in the directions of arrows X) is done, thus increasing pressurizing force. The area S1 of the joint surface 3 raked toward the inside of the lamp body 2 is extremely smaller than the area S2 of the joint surface raked outside (S1<S2) as shown in FIG. 2A, which results in melting the joint surface 3 of the lamp body 2 at high temperatures deriving from the vibration friction of the fusion-welding leg 5, slightly fusion-deforming the front end side itself of the fusion-welding leg 5, fitting the fusion-welding leg in while raking molten burrs C1 and C2 outside along the tapered surface 5a on the side of the joint surface 3 as shown in FIG. 2B, raking most of the molten burr (C1) outside the fusion-welding leg, and limiting the burrs thus produced to a small columnar burr C2 toward the inside of the lamp body 2 as shown in FIGS. 2C and 2D.

Figure 2D:
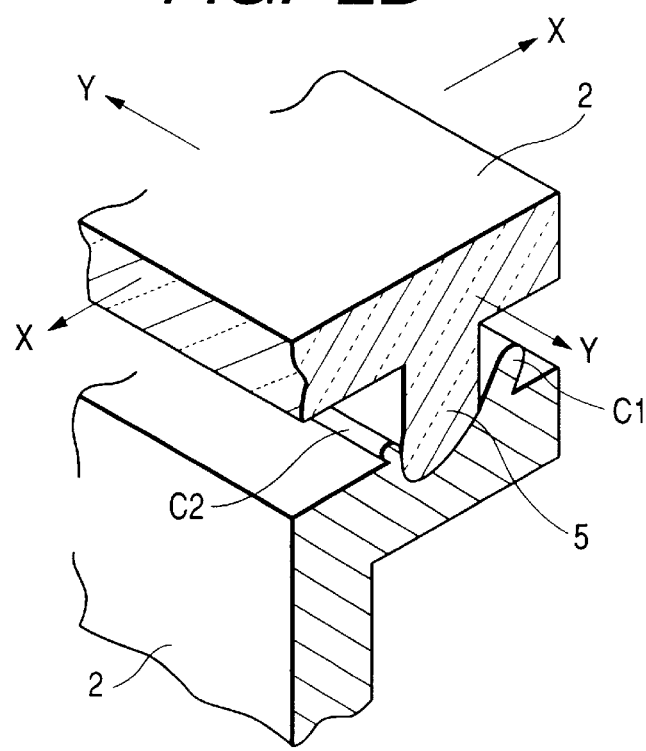
FIG. 2D is an enlarged perspective view thereof showing the burrs that have been produced.

As shown in FIG. 2D, the fusion-welding leg 5 in this case may be subjected to the vibration-fusion-welding in the direction of not only an arrow X but also an arrow Y with needless to say the same effect.

The width Z1 of the front end of the fusion-welding leg 5 with respect to the joint surface 3 preferably and substantially ranges in width from 0.5 to 1.2 mm; if the width is smaller than what has been defined above, the front end of the fusion-welding leg 5 may eat into the joint surface 3 of the lamp body 2 at the time of pressure-welding because of the pressurizing force, and may be damaged because of the vibrations, whereas if the width Z1 is greater than what has been defined above, the frictional heat is hardly generated as the pressurizing force is dispersed.

It is therefore possible not to increase unwanted projections inside the lamp chamber 7 after the fusion-welding leg and the lamp body are fusion-welded together but to improve the light emission efficiency of the lamp as well as design quality. At the fusion-welding time, moreover, the fusion-welding leg 5 is ultimately fusion-welded to a portion having a width of Z2 on the upper side of the fusion-welding leg 5 and the adhesion therebetween is improved, whereby the production of the burr C2 toward the inside of the lamp body 2 can be minimized.

Figure 3A:
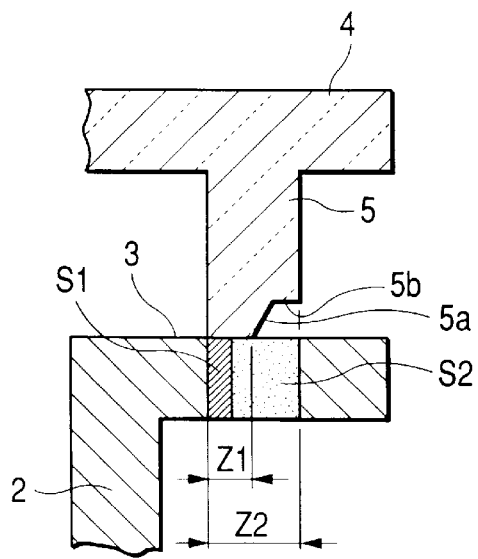
FIG. 3A is an enlarged sectional view of the principal part of the fusion-welding leg according to the second embodiment of the invention.
Figure 3B:
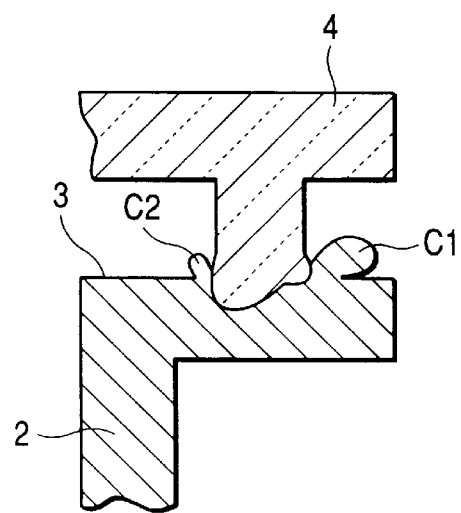
FIG. 3B is an enlarged sectional view of the principal part thereof after the fusion-welding operation.

FIGS. 3A and 3B shows a second embodiment of the invention concerned with a vibration-fusion-welding leg of a vehicle lamp according to the present invention.

In this embodiment, a stepped portion 5b is formed in the upper portion of the tapered surface 5a in the first embodiment of the invention as shown in FIG. 3A. With the formation of the stepped portion 5b, the area melted on the inside of the lamp body 2 is reduced when the front end of the fusion-welding leg 5 is brought into contact with the joint surface 3 of the lamp body 2 by the width Z1 and at the time of fusion-welding, because the burr C1 is suppressed by the stepped portion 5b from overhanging toward the upper outer side of the lamp body 2, the production of the burrs C in the upper direction of the joint surface 3 is lowered. The ratio of the raked area of the joint surface 3 inside the lamp body 2 to the raked area thereof outside the lamp body 2 is S1<S2 as in the first embodiment of the invention, so that the raked quantity of the burrs C toward the inside portion is kept small.

Figure 4A:
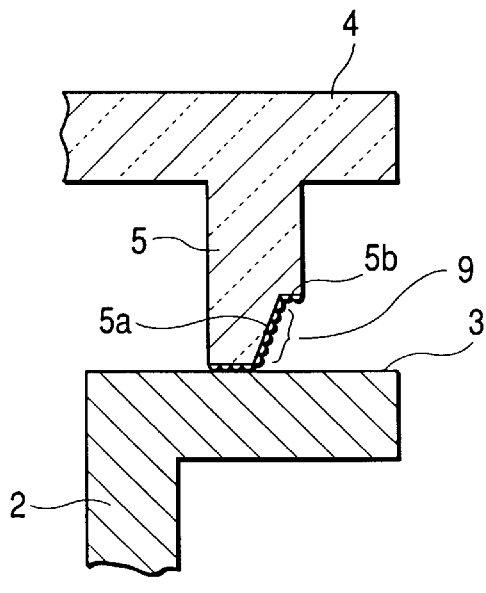
FIG. 4A is an enlarged sectional view of the principal part of the fusion-welding leg according to the third embodiment of the invention.
Figure 4B:
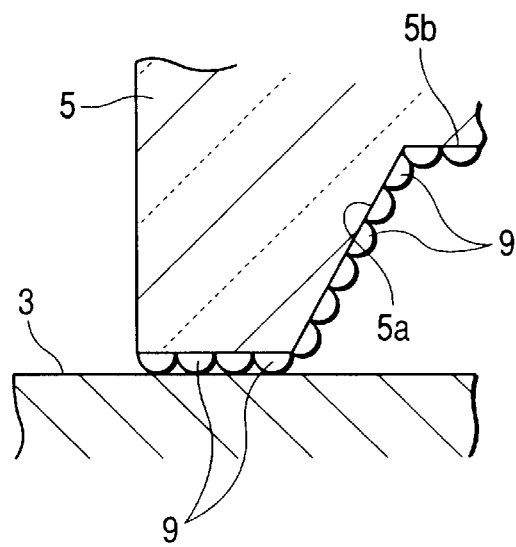
FIG. 4B is an enlarged sectional view of the principal part thereof showing a state in which an embossed surface abuts against the joint surface of a lamp body.
Figure 5:
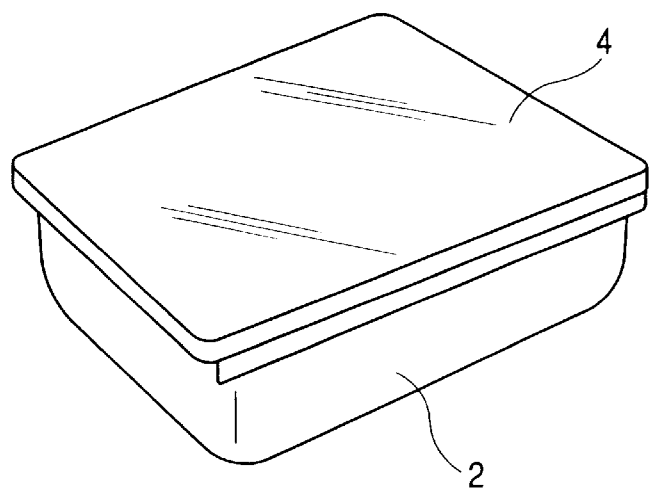
FIG. 5 is a perspective view of a vehicle lamp in a fusion-welded state.

FIGS. 4A and 4B show a third embodiment of the invention concerned with a vibration-fusion-welding leg of a vehicle lamp according to the present invention.

In this embodiment, the surface of the tapered surface 5a and the stepped portion 5b are subjected to embossing treatment to generate vibration friction with the joint surface 3 of the lamp body 2 in order to increase the frictional coefficient. As the embossed surface is kept from untouching the joint surface 3 of the lamp body 2 but allowed to touch the joint surface 3 only by the tip of each embossed part, the whole contact area is decreased with the effect of increasing the pressurizing force per unit area, thus increasing the heat-generating efficiency. Therefore, the fusion of the joint surface 3 is facilitated and the fusion-welding can be attained in a short time, which results in decreasing the quantity of molten resin and as in the second embodiment of the invention, forming the burr produced from the fusion-welding into a spherical shape and giving neat finish.

The front lens 4 used in this embodiment is made of, for example, acrylic resin material, whereas the lamp body 2 is molded from synthetic resins such as ABS, AAS and so on. In other words, with respect to the combination of synthetic resins, the resin material of the front lens 4 as one of the workpieces W preferably has thermal deformation and thermal melting temperatures higher than those on the side of the lamp body 2 as the other workpiece W. With the combination of both workpieces, the material used to form one workpiece W (on the side of the front lens 4 in this embodiment) eats into the material used to form the other workpiece (on the side of the front lens 4 in this embodiment) for the purpose of increasing the degree of bond between both workpieces, and cool-solidifying the aforesaid wedge-like joint thus formed in order to strengthen the integration of both workpieces.

Although a description has been given of the vehicle lamp 1 in which the plastic front lens 4 is fusion-welded to the plastic lamp body 2 in the first to third embodiments of the present invention, the present invention is needless to say applicable to a case where two kinds of differently colored first and second lenses 4, 4 are joined together or where different lamp bodies 2, 2 are joined together.

Figure 6:
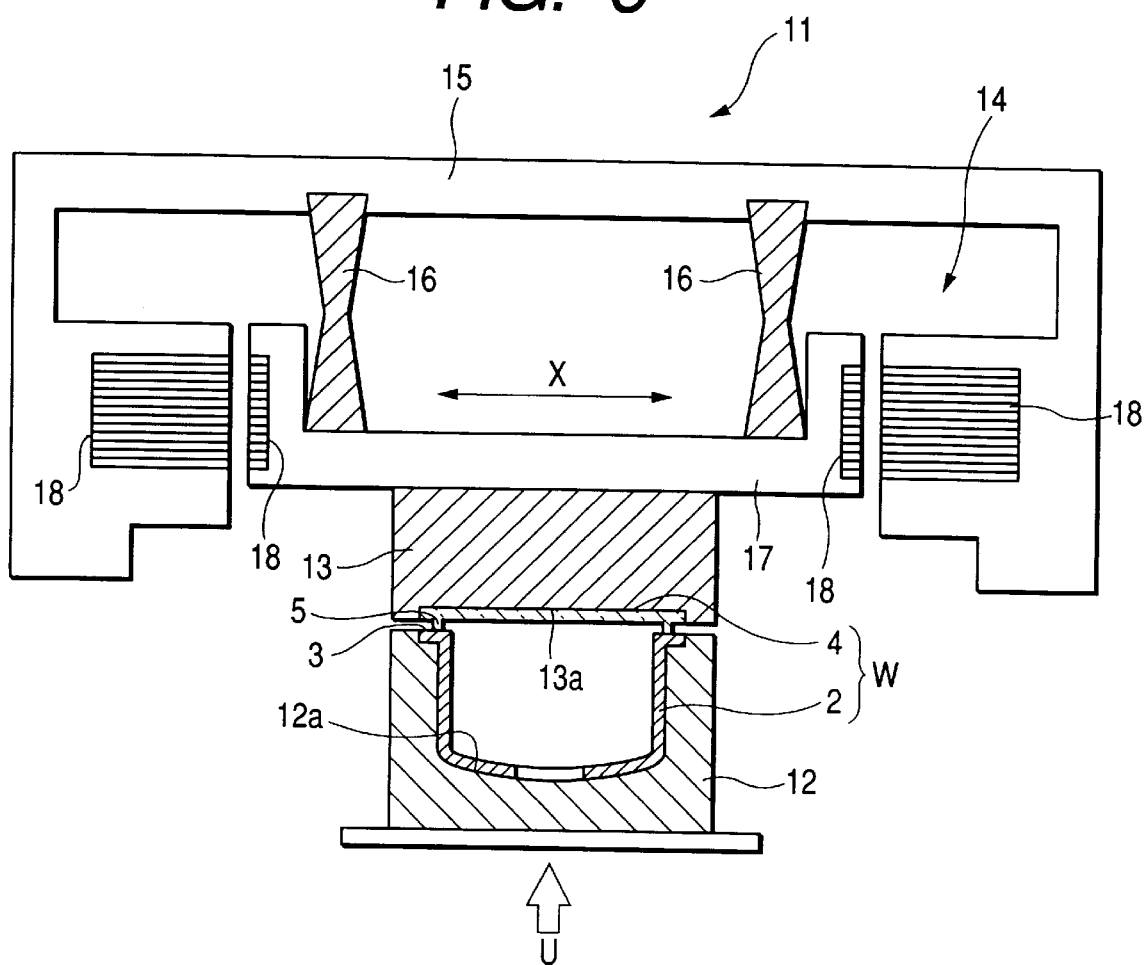
FIG. 6 is a diagram illustrating a fusion-welding principle for implementing a vibration-fusion-welding method according to the present invention.
Figure 7A:
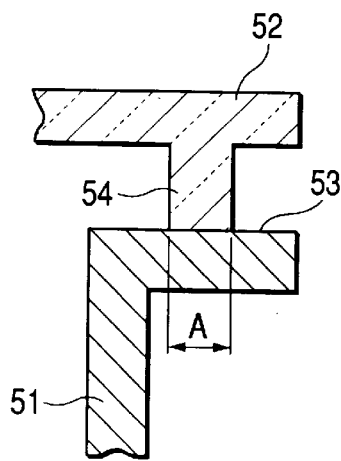
FIG. 7A is an enlarged sectional view of the principal part of the conventional fusion-welding leg having equal vertical thickness.
Figure 7B:
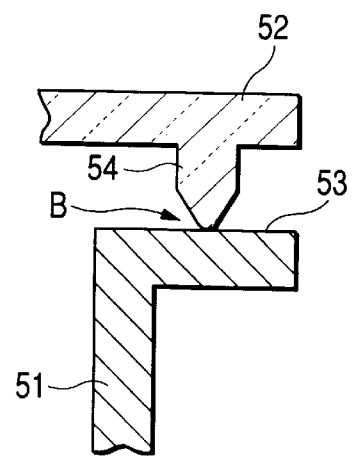
FIG. 7B is an enlarged sectional view of the principal part thereof showing the leading end portion that has been tapered off.

FIG. 6 shows a fusion-welding apparatus 11 for manufacturing the vehicle lamp 1 under the vibration-fusion-welding method and what has the fusion-welding leg vibration-fusion-welded to the lamp body according to the present invention.

This fusion-welding apparatus 11 is designed to integrally join the workpieces W by causing frictional heat to be generated in the predetermined fusion-welding portion between the workpieces by utilizing electromagnetic vibrations, melting the material of the predetermined fusion-welding portion by means of the frictional heat, and then cool-solidifying the workpieces. The fusion-welding apparatus 11 comprises a stationary lower receiving jig 12 forming a recessed portion 12a in the top surface of which the lamp body 2 as one of the workpieces W is fitted, a driving-side upper receiving jig 13 forming a recessed portion 13a in the underside of which the front lens 4 as the other workpiece W is fitted, and a vibration generating unit 14 for electromagnetically vibrating the upper receiving jig 13.

The vibration generating unit 14 comprises a vibrator 17 suspended via highly rigid elastic bodies 16, 16 from the undersurface of the top of a support 15, the vibrator 17 being laterally movable, electromagnets 18, 18 laterally arranged opposite to each other, and the upper receiving jig 13 secured to the underside of the vibrator 17. Consequently, the electromagnetic vibrations are generated (in the direction of arrow X) by alternately supplying current to the lateral electromagnets 18, 18 to alternately absorb the vibrator 17 to the left and right (laterally) in order to vibrate the upper receiving jig 13 together with the vibrator 17. In this embodiment, the electromagnetic vibrations of the vibrator 17 is so arranged as to generate vibrations laterally at a frequency of about 240 Hz. Incidentally, the method of generating the electromagnetic vibrations is not limited to what has been mentioned above but may needless to say be modified properly to generate similar electromagnetic vibrations.

The lamp body 2 (the other workpiece W) is fitted into the recessed portion 12a formed in the upper portion of the lower receiving jig 12 and a rib (not shown) which is formed on the peripheral edge of the joint surface 3 is securely fitted in a groove (not shown) on the side of the lower receiving jig 12 and besides the front lens 4 (one workpiece W) is fixed within the recessed portion 13a formed in the underside of the lower receiving jig 12. Then, the lower receiving jig 12 is properly lifted (in the direction of an arrow U) by an elevator (not shown) and the workpieces W (the lamp body 2 and the front lens 4) are clamped between the upper receiving jig 13 and the lower receiving jig 12. Further, the front end of the fusion-welding leg 5 of the front lens 4 is brought into contact with the predetermined joint between the workpieces W, that is, the joint surface 3 of the lamp body 2 under pressure, and the vibration generating unit 14 is caused to generate the electromagnetic vibration ranging approximately from 1 to 1.2 mm in a direction perpendicular to the pressurizing direction, so that frictional heat is generated locally in the pressurized contact portion.

With the vibration-fusion-welding apparatus according to the present invention, the fusion-welding work can be carried out with a frequency of about 240 Hz and vibrations as small as about 1–1.2 mm in amplitude, which results in imposing less restriction on the method of constructing the workpieces as long as their external shapes are concerned, whereby the work of fusion-welding many products (parts) is facilitated. The fusion-welding work can be done even in cases even where the fusion-welding leg 5 as the predetermined joint of the front lens 4 as the workpiece W, for example, is shortened, where the fusion-welding leg 5 of the front lens 4 is formed by rounding the predetermined joint of the lamp body 2 by about 90° and where the fusion-welding line is formed as a simple curved surface.

The material used for the predetermined joint between both workpieces is subjected to thermal deformation or melting because of the frictional heat, and the front end of the fusion-welding leg 5 of the front lens 4 as the other workpiece W is press-fitted into the joint surface 3 of the lamp body 2 as one workpiece W, so that the outer peripheral portion at the front end of the fusion-welding leg 5 is covered with the molten material of the joint surface 3 of the lamp body 2. When the electromagnetic vibration in this state is stopped while the workpieces are cool-solidified, a wedge-like bonding joint is formable in the predetermined joint between both workpieces W. In other words, the fusion-welding leg 5 of the front lens 4 can be securely fusion-welded to the joint surface 3 of the lamp body 2.

Since the fusion-welding leg in the vehicle lamp is thus constructed according to the present invention, the front end of the fusion-welding leg of the front lens eats into the joint surface of the lamp body like a wedge with the effect of making solid fusion-welding possible. When the vibration-fusion-welding is carried out, a vehicle lamp excellent in not only external appearance but also design quality can be manufactured by raking the burrs produced from the joint surface out of the fusion-welding leg as many as possible, minimizing the production of burrs inward, and improving the light emission efficiency of the vehicle lamp.

With the structure of the fusion-welding leg in the vehicle lamp according to the present invention, since the pressurizing force applied to the joint surface on the lamp body side is improved at the time of fusion-welding, the vibration-fusion-welding workability in the vehicle lamp can be raised by generating frictional heat at high temperatures as the fusion-welding work is completed in a short time. Moreover, the fusion-welding apparatus for implementing the vibration-fusion-welding method according to the present invention is simple enough to ensure that its operation is performed. In comparison with any other conventional vehicle lamp, the effect that can be attained according to the present invention is greatly noticeable in that the operation of the fusion-welding apparatus is surely performed; the finished external appearance of the vehicle lamp is improved; and the time required to do the fusion-welding work is considerably shortened.

What is claimed is:

1. A fusion-welding leg in a vehicle lamp for attaching a vehicle lamp lens to a vehicle lamp body by vibration-fusion-welding a joint surface of the fusion-welding leg to a joint surface of the lamp body, the fusion welding leg comprising:

a front end, an inside surface facing an inside of the vehicle lamp and extending from the front end of the fusion-welding leg, and an outside surface facing an outside of the vehicle lamp and extending from the front end of the fusion-welding leg, and wherein the inside surface is perpendicular to the joint surface of the lamp body, and the outside surface is tapered so as to increase a width of said fusion-welding leg in a direction away from the front end; and wherein said fusion welding leg is made of a resin material having a thermal melting temperature which is higher than a thermal melting temperature of the lamp body at the joint surface of the lamp body.

2. A fusion-welding leg in a vehicle lamp as claimed in claim 1, wherein a tip of the fusion-welding leg at the front end substantially ranges in width from 0.5 to 1.2 mm.

3. A fusion-welding leg in a vehicle lamp as claimed in claim 1, further comprising a stepped portion formed in an upper portion of the tapered surface formed on the outside of the fusion-welding leg.

4. A fusion-welding leg in a vehicle lamp as claimed in claim 1, wherein when the vibration-fusion-welding is carried out, a whole contact edge face of the fusion-welding leg is fusion-welded to the joint surface on the lamp body side.

5. A fusion-welding leg in a vehicle lamp as claimed in claim 1, wherein a frictional coefficient is increased by subjecting the joint surface of the fusion-welding leg to embossing.

6. The fusion-welding leg in a vehicle lamp as claimed in claim 5, wherein the tapered surface of the fusion-welding leg is subjected to embossing.

7. The fusion-welding leg in a vehicle lamp as claimed in claim 1, wherein said fusion-welding leg has a flat edge face at a front distal end thereof, said flat edge face adapted to uniformly contact the joint surface of the lamp body.

8. A vehicle lamp, comprising:
a lamp body having a front opening formed of first thermoplastic synthetic resin;
a front lens formed of second thermoplastic synthetic resin coupled to the front opening of said lamp body to define a lamp chamber;
a light source coupled to said lamp body and disposed within said lamp chamber;
a contact surface formed integrally with one of said lamp body and said front lens; and
a fusion-welding leg formed integrally with the other of said lamp body and said front lens, said fusion-welding leg is welded to said contact surface by vibration, said fusion-welding leg comprises:
a front end,
an inside surface facing an inside of the lamp body and extending from the front end of the fusion-welding leg, and
an outside surface facing an outside of the lamp body and extending from the front end of the fusion-welding leg, and
wherein the inside surface is perpendicular to the contact surface, and the outside surface is tapered so as to increase a width of said fusion-welding leg in a direction away from the front end.

9. A vehicle lamp of claim 8, wherein a tip of the fusion-welding leg at the front end substantially ranges in width from 0.5 to 1.2 mm.

10. A vehicle lamp of claim 8, wherein said fusion-welding leg further comprising a stepped portion formed in an upper portion of the tapered surface formed on the outside of the fusion-welding leg.

11. A vehicle lamp of claim 8, wherein when the vibration-fusion-welding is carried out, a whole contact edge face of the fusion-welding leg is fusion-welded to the contact surface.

12. A vehicle lamp of claim 8, wherein at least said tapered surface of said fusion-welding leg is subjected to embossing treatment.

13. A vehicle lamp of claim 8, wherein said first thermoplastic synthetic resin comprises a group consisting of AAS and ABS resin, and said second synthetic resin comprises a group consisting of acrylic series synthetic resin.

14. The vehicle lamp as claimed in claim 8, wherein the second thermoplastic resin has a thermal melting temperature which is higher than a thermal melting temperature of the first thermoplastic resin.

15. A method of molding a vehicle lamp, comprising steps of:
molding a lamp body by a first thermoplastic synthetic resin having a front opening and a flange surrounding the front opening;
molding a lens by a second thermoplastic synthetic resin having a leg projecting therefrom, said leg having
a front end,
an inside surface facing an inside of the vehicle lamp and extending from the front end of the leg, and
an outside surface facing an outside of the vehicle lamp and extending from the front end of the leg, and
wherein the inside surface is perpendicular to the joint surface of the lamp body, and the outside surface is tapered so as to increase a width of the leg in a direction away from the front end;
coupling the leg of the lens to the flange of the lamp body;
generating frictional heat by utilizing electromagnetic vibrations;
applying the frictional heat and fusing the flange of the lamp body and the leg of the lens; and
cool-solidifying the lamp body and the lens.

16. The method of claim 15, wherein the electromagnetic vibrations are generated under a frequency of approximately 240 Hz and amplitude of approximately within a range of 1 to 1.2 mm.

17. The method of claim 15, wherein the tapered surface of said leg comprises a stepped portion at an upper portion of said tapered surface.

18. The method of claim 15, further comprising a step of subjecting said tapered surface of said leg with embossing treatment before coupling the leg to the flange of the lamp body.

19. The method of claim 15, wherein said first thermoplastic synthetic resin comprises a group consisting of AAS and ABS resin, and said second synthetic resin comprises a group consisting of acrylic series synthetic resin.

20. The method of claim 15, wherein the second thermoplastic resin has a thermal melting temperature which is higher than a thermal melting temperature of the first thermoplastic resin.

21. A fusion-welding leg in a vehicle lamp for attaching a vehicle lamp lens to a vehicle lamp body by vibration-fusion-welding a joint surface of the fusion-welding leg to a joint surface of the lamp body, the fusion welding leg comprising:
a front end,
an inside surface facing an inside of the vehicle lamp and extending from the front end of the fusion-welding leg, and an outside surface facing an outside of the vehicle lamp and extending from the front end of the fusion-welding leg, and wherein the inside surface is perpendicular to the joint surface of the lamp body, and the outside surface is tapered so as to increase a width of said fusion-welding leg in a direction away from the front end; and wherein a frictional coefficient is increased by subjecting the joint tapered surface of the fusion-welding leg to embossing.

* * * * *